June 5, 1956 D. A. McCUTCHEON 2,748,755
HUMIDIFYING APPARATUS FOR INTERNAL COMBUSTION ENGINES
Filed Sept. 23, 1953 3 Sheets-Sheet 1

INVENTOR
DOYLE A. McCUTCHEON.
BY Gustan Miller
ATTORNEY

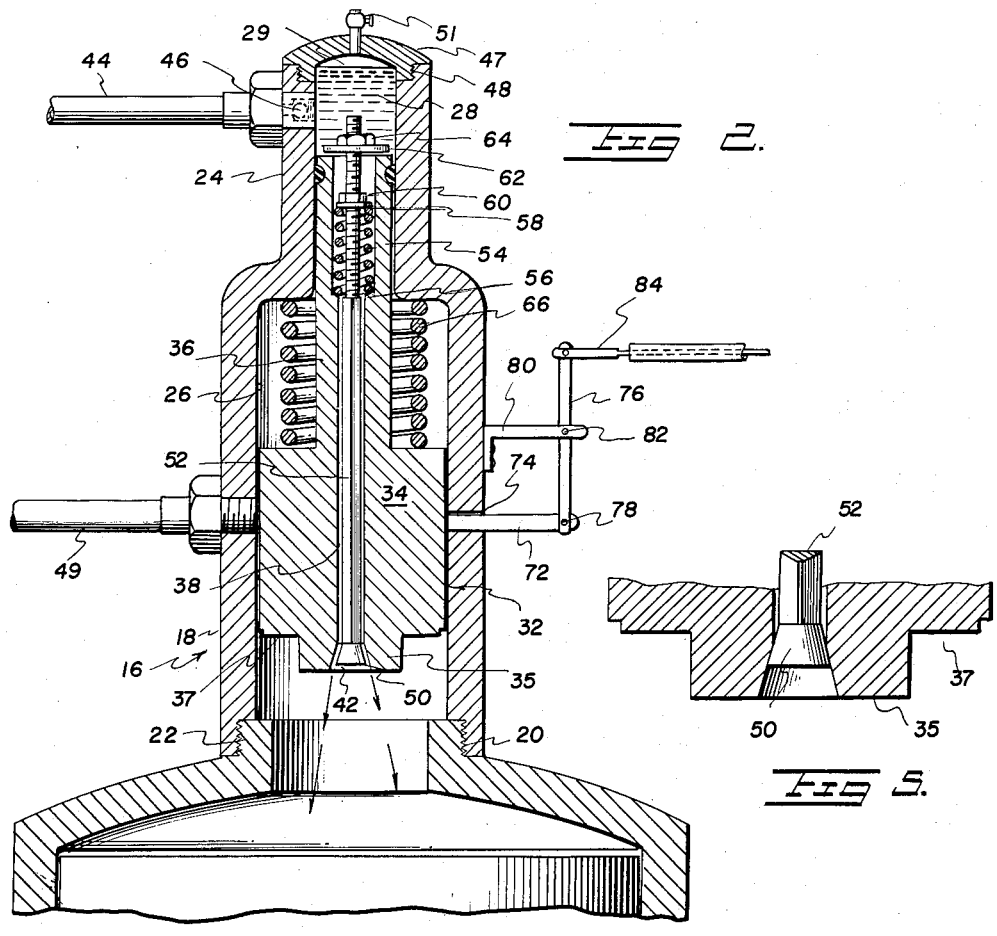

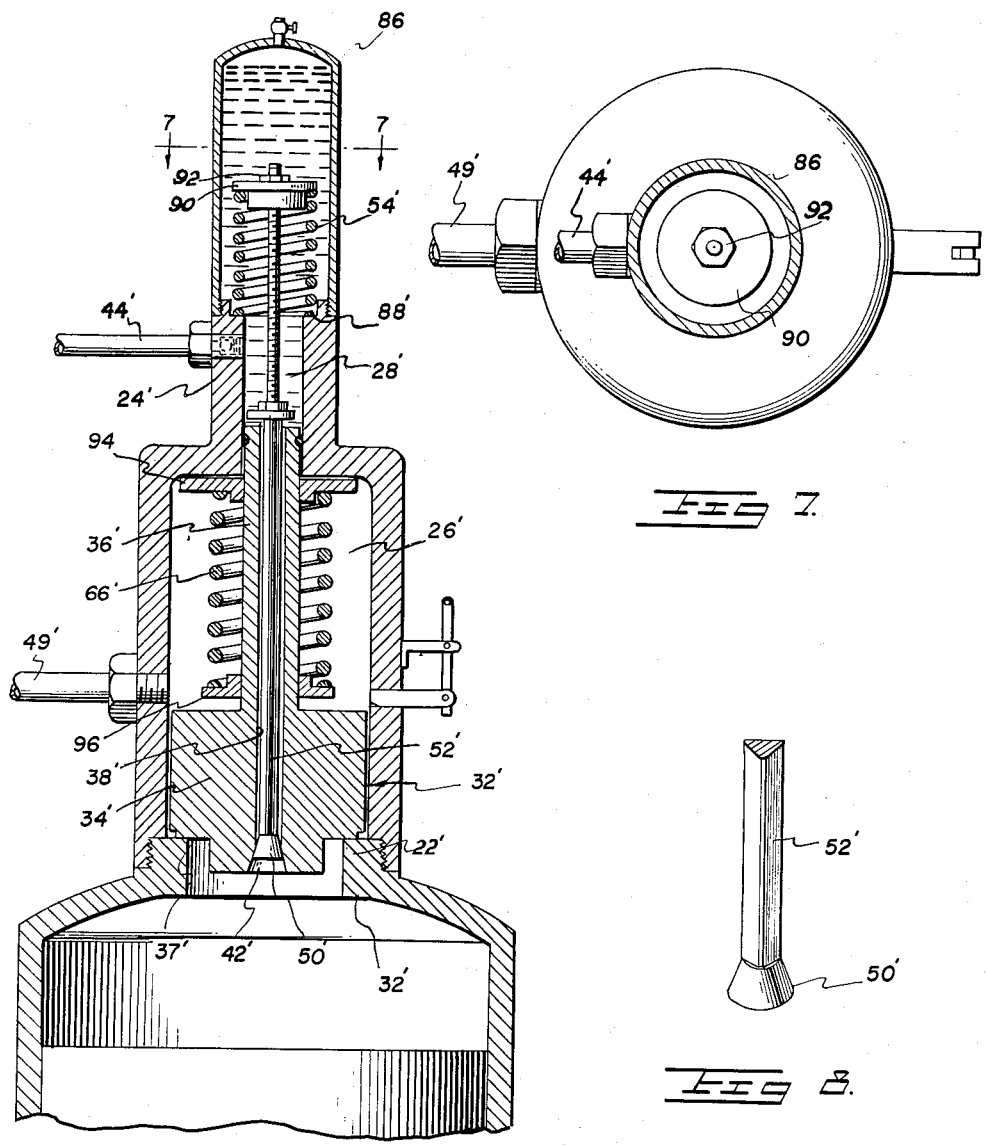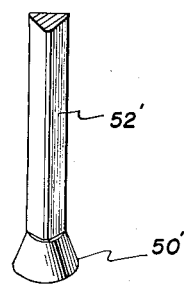

United States Patent Office 2,748,755
Patented June 5, 1956

2,748,755
HUMIDIFYING APPARATUS FOR INTERNAL COMBUSTION ENGINES

Doyle A. McCutcheon, Watsonville, Calif.

Application September 23, 1953, Serial No. 381,855

5 Claims. (Cl. 123—25)

This invention relates to humidifying apparatus for internal combustion engines and more particularly to an apparatus for injecting water into the cylinder of an internal combustion engine to improve engine performance.

It is well known that the humidification of the atmosphere within the cylinder of an internal combustion engine, either of the gasoline or diesel type, improves engine performance and results in more efficient operation of the engine. Many devices and systems are known for accomplishing this object, many of these devices using the vacuum or suction from the intake manifold to cause the introduction of the liquid into the combustion chamber of the engine.

It is an object of this invention to provide a simple and reliable apparatus for humidifying the combustion chamber of an internal combustion engine.

It is a further object of this invention to provide an apparatus which will automatically introduce a humidifying liquid into an internal combustion engine cylinder on the working stroke of the piston operating in the given cylinder.

It is a further object of this invention to provide an apparatus for introducing water into the cylinder of an internal combustion engine in automatic timed relation to the reciprocation of the piston in the cylinder.

In accordance with these objectives, this invention provides an injection apparatus which is attached to an internal combustion engine in such manner that a movable piston member of the injection device is exposed directly to the combustion space of the cylinder. An upper end of the same piston member is in communication with a chamber which is substantially entirely filled with water, except for a small air pocket. The piston of the injection device is provided with an axial passage to receive a relief valve and its spindle. When ignition occurs in the cylinder to which the injection device is connected, the sharp increase in pressure pushes the piston of the injection device upwardly so that its upper end moves through and displaces water contained in the water chamber above the top of the piston. The resulting pressure in the water chamber causes the relief valve to open, causing water to flow through the relief valve in such manner as to be sprayed in the form of a fine mist into the combustion space of the engine cylinder. The water so injected into the combustion space results in improved performance of the engine and greater operating efficiency.

The features of this invention which are believed to be novel are set forth with particularity in the appended claims. The invention itself, however, both as to its organization and use, together with further objects and advantages thereof, may best be understood by reference to the following description taken in connection with the accompanying drawings in which:

Fig. 2 is a view of the apparatus of Fig. 1 when the piston of the injection apparatus has been moved upwardly to cause the injection of water into the combustion chamber of the internal combustion engine cylinder;

Fig. 3 is a view in section along line 3—3 of Fig. 1;

Fig. 5 is an enlarged detail view of the relief valve and valve seat showing the valve in closed position;

Fig. 6 is a view in sectional elevation of a modified form of injection apparatus in accordance with the invention;

Fig. 7 is a view in section along line 7—7 of Fig. 6;

Fig. 8 is an enlarged detail view of a portion of the relief valve and valve spindle used in both of the forms of the invention.

Figure 1:
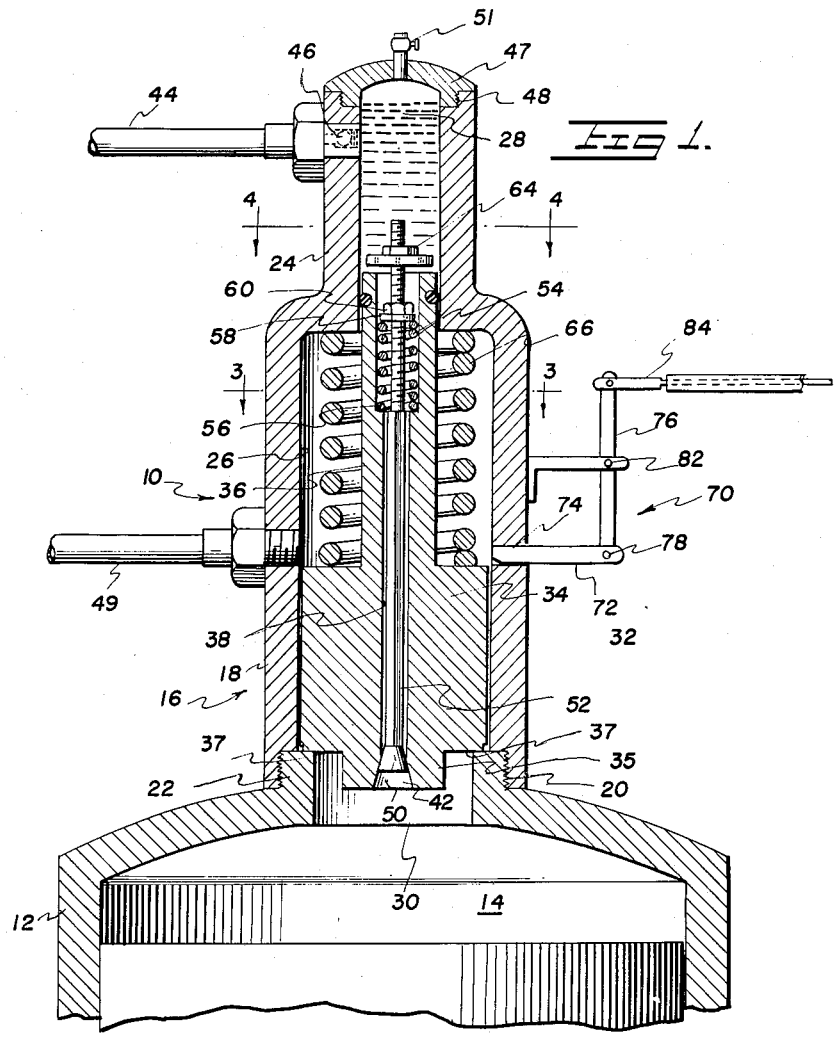
Fig. 1 is a sectional view in elevation showing the injection apparatus of the invention mounted on the cylinder head of an internal combustion engine and with the piston of the injection apparatus in its unactuated position.
Figure 4:
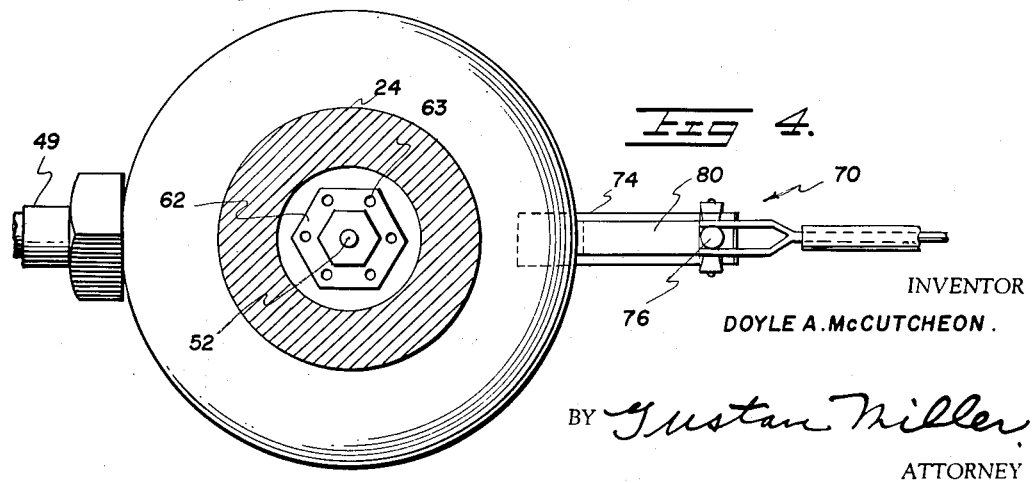
Fig. 4 is a view in section along line 4—4 of Fig. 1.

Referring now to the drawings, and more particularly to Figs. 1–5, there is shown a water injection apparatus generally indicated at 10 mounted upon the outer head 12 of a cylinder 14 of an internal combustion engine.

The injection apparatus 10 comprises a tubular casing generally indicated at 16 having a main body portion 18 which is rigidly but detachably connected, as by a screw threaded connection 20, to an annular shoulder 22 provided on the cylinder head. The casing 16 reduces in diameter at its upper end to provide a neck portion 24 of smaller diameter than the main body portion 18 of the casing. The casing 16 is provided with a hollow interior comprising a chamber 26 within the main body portion 18 and a chamber 28 within the neck portion 24. The casing is open at its bottom so as to communicate with the interior of the cylinder 14 through the passage or opening 30 in the cylinder head.

A piston member generally indicated at 32 is adapted for axial reciprocation within the casing 16. Piston 32 is provided with a lower piston portion 34 just slightly less in diameter than the diameter of chamber 26 in the main body portion 18 of the casing. The lower end of the piston is provided with a central portion 35 which extends further in an axial direction than the radially outer surface of the lower end of the piston, the radially outer surface of the piston forming an annular shoulder 37 which seats on the annular shoulder 22 of the cylinder head when the piston 32 is in the position shown in Fig. 1.

The piston 32 is also provided with an elongated piston portion 36 which is just slightly less in diameter than the diameter of the chamber 28 in the neck portion 24.

The piston 32 is provided with an axial passage 38 which is cylindrical in cross section and which extends through both the piston portions 34 and 36. Passage 38 terminates in a counterbore 40 of larger diameter at the upper end of the piston portion 36 and terminates at its opposite end in a tapered orifice 42 at the lower end of the piston portion 34.

The chamber 28 is in communication with a water supply through a conduit 44. A ball check valve 46 is interposed in the path of liquid flow from conduit 44 where it enters the chamber 28 in order to admit liquid to the chamber 28 but to prevent reverse flow of liquid from chamber 28 into the conduit 44. A removable cap member 47 is detachably connected to the upper end of the neck portion 24, as by means of a screw threaded connection 48. An air bleed-off valve 51 is provided in the cap 47. A conduit 49 is connected to the chamber 26 to serve as an exhaust line for any leakage which may get into the space above the piston portion 34.

The relief valve 50 is adapted to move axially within the tapered orifice 42 and is so proportioned that when the valve 50 is moved downwardly with respect to the view shown in Fig. 1 there is a clearance between the outer tapered surface of the valve 50 and the inner tapered surface of the orifice 42. The valve 50 is provided with an elongated spindle portion 52 which is triangular in cross section and which passes upwardly through the cylindrical passage 38 and through the counterbore 40 to project outwardly beyond the top surface of the piston portion 36. A spring member 54 is positioned in the counterbore portion 40 of the passage 38 and the lower end of the spring 54 is adapted to seat on the lower shoulders 56 of the counterbore 40. A nut member 58 is positioned on the outer threaded end of the spindle 52 and is so positioned on the threaded portion as to compress the spring 54 to any desired degree. The compression of the spring 54 is adjusted by the nut 58 to cause the relief valve 50 to open at a predetermined desired pressure. A lock nut 60 is positioned adjacent the spring tension adjustment nut 58. A nut member 62 of larger diameter than the counterbore 40 is positioned adjacent the outer end of the spindle 52 to regulate the degree of opening of the valve 50 and to prevent excessive opening of valve 50. A lock nut 64 is positioned adjacent the nut 62. Nut 62 is provided with apertures 63 which permit flow of water through the nut 62 into the passage 38 even when the nut is seated on the upper end surface of the piston 32.

A large spring 66 is positioned in the chamber 26 to surround the upper piston portion 36. The lower end of the spring 66 bears upon the upper surface of the lower piston portion 34 while the upper end of the spring bears against the upper inside surface of the chamber 26. The spring 66 serves to return the piston 32 from the position of Fig. 2 to the position of Fig. 1 after the completion of the injection of water into the combustion chamber of the cylinder of the internal combustion engine, as will be explained hereinafter.

In order to prevent operation of the water injecting mechanism when desired, a locking means generally indicated at 70 is provided. Locking means 70 comprises a sliding bar 72 which is adapted to pass through an aperture 74 in the side of the casing portion 18 and into the chamber 26 to engage the upper surface of the piston portion 34 to thereby prevent the piston 32 from moving. The sliding bar 72 is actuated by a lever 76 which is pivotally connected to the sliding bar 72 at pivot point 78 and to a support 80 at a pivot point 82. The lever 76 is actuated by a connecting link 84 which may be operated by any desired means.

The operation of the apparatus will now be described. The view of Fig. 1 shows the position occupied by the various parts of the device before ignition has occurred in the combustion chamber of the cylinder 14. The lower annular shoulder 37 of the piston 32 rests on the annular shoulder 22 of the cylinder head. The spring 54 bears against the adjustment nut 58 in such manner as to raise the spindle 52 and the valve 50 to a position where the valve 50 closes the orifice 42 of the passage 38 to prevent flow of water through the orifice 42. The chamber 28 is filled with water except for a small air pocket 29 at the upper end of the chamber and some of the water has passed downwardly from chamber 28 into the passage 38 since the entire area of the passage is not filled by the triangular-shaped spindle 52. The air pocket 29 is very small but serves to provide a flexibility of action of the piston 32.

When ignition occurs in the cylinder 14, the pressure developed by the gases in the cylinder impinges upon the bottom surface of the piston 32 and forces the piston up to the position shown in Fig. 2 against the force of the spring 66. This causes the upper piston portion 36 to push upwardly into the water chamber 28 thereby displacing water in the chamber 28. The pressure developed in the chamber 28 by the upward motion of the piston portion 36 forces the spindle 52 downwardly against the force of its biasing spring 54 and moves the valve 50 to an unseated position. Water which is already in the passage 38, as well as additional water forced into the passage by the increased pressure in chamber 28, is ejected through the orifice 42 to form a circular water spray which passes into the combusion space in cylinder 14. The water spray humidifies the atmosphere of the combustion space, improves combustion, and increases engine efficiency.

Upon the completion of the ignition stroke of the piston in the internal combustion engine cylinder 14, the pressure is relieved underneath the surface of the piston 32 and the spring 66 returns the piston 32 to the position shown in Fig. 1. At the same time pressure is relieved in the chamber 28 and the spring 54 returns the spindle 52 and valve 50 upwardly to the position shown in Fig. 1 so that the orifice 42 is closed and water is therefore no longer ejected through the orifice.

The modified form of the invention shown in Fig. 6 is in general similar to the form previously described, and those parts which are similar to the embodiment of Fig. 1 will not be described in detail again. Corresponding parts in the embodiment of Fig. 6 are indicated by primed reference numerals. The principal difference between the embodiment of Fig. 6 and that of Fig. 1 relates to the arrangement of biasing spring 54' and the main spring 66'. The piston 32' has a main body portion 34' and a portion 36' of reduced diameter, the piston portion 36' operating in the water chamber 28' which is connected to a source of water supply through a conduit 44'. The piston 32' is provided with an axial passage 38' and an orifice 42'. A relief valve 50' operates in the orifice 42' and is attached to a spindle 52' of triangular cross section which operates in the axial passage 38'. All of the parts just mentioned are the same as those of the embodiment of Fig. 1.

Instead of positioning the relief valve biasing spring 54' inside of a counterbore portion of the upper piston portion 36', as in the case of the embodiment of Fig. 1, the biasing spring 54' is instead positioned above the water chamber 28' in a housing 86 which is supported by the upper end of the neck portion 24' of the injection casing. The lower end of the spring 54' bears against the upper surface 88 of the neck portion 24' and the tension on the spring 54' is maintained by a spring holder 90 which bears against the upper end of the spring 54' and is held in place by a lock nut 92 which is positioned on the upper threaded end of the spindle 52'. The position to which the spring holder 90 is adjusted regulates the pressure at which the valve 50' opens. The upper end of spring member 66' in chamber 26' bears against a spring holder 94 through which the piston portion 36' is free to move and at its lower end the spring 66' bears against a spring holder 96 through which the piston can also freely move.

An important feature of the construction of the embodiment of Fig. 6 is the fact that the natural length of larger spring 66' when it has reached its uncompressed state on the return or down stroke of the piston 32', is of shorter axial length than the axial distance between the upper surface of the bottom piston portion 34' and the upper end of the chamber 26', with the piston in seated position. This allows the small spring 54' to absorb inertia of the piston on its return stroke, and prevents battering of the lower surface 37' of the piston against the shoulder 22' of the cylinder head.

The operation of the embodiment of Fig. 6 is similar to that previously described in connection with the embodiment of Fig. 1 in that the compressive force occurring at ignition in the combustion chamber of the engine cylinder forces the piston 32' upwardly, forcing the piston portion 36' upwardly through the water in the water chamber 28' and causing the water pressure in that chamber to force the spindle 52' and the valve 50' downwardly to an open position. This permits water under pressure to pass through the passage 38' and be ejected in the form of a spray into the combustion chamber where it helps to improve the performance of the engine.

It can be seen from the foregoing that there is provided in accordance with this invention a simple apparatus for humidifying the combustion chamber of an internal combustion engine to provide an improved engine performance in accordance with the well-known effects of such humidifying action. The apparatus of this invention is so constructed and related with respect to the internal combustion engine that the injecting apparatus injects water into the combustion chamber of the cylinder during each power stroke of the piston operating in the cylinder of the engine. The water injecting device of the invention is therefore so constructed as to be in synchronization with the engine and so as to keep pace with the changing acceleration of the engine.

While there have been shown and described particular embodiments of the invention, it will be obvious to those skilled in the art that various changes and modifications can be made therein without departing from the invention, and, therefore, it is aimed in the appended claims to cover all such changes and modifications as fall within the true spirit and scope of the invention.

Having thus set forth and disclosed the nature of this invention, what is claimed is:

1. An apparatus for injecting water into the cylinder of an internal combustion engine comprising a casing adapted for mounting on a cylinder head of an engine, the end of said casing adjacent said cylinder head being open to communicate with an opening in said cylinder head, the interior of said casing being hollow and comprising a first chamber at the end of said casing adjacent said cylinder head and a second chamber of smaller diameter than said first chamber and forming a continuation of said first chamber at the opposite end of said casing, a piston member movable in said casing, said piston member comprising a first piston portion movable in said first chamber and a second piston portion of smaller diameter than said first piston portion and extending from said first chamber into said second chamber, said second chamber normally containing a supply of water and also an air pocket at the top thereof providing flexibility of action of the piston, a passage extending through said first and second piston portions, a valve means controlling flow of water through said passage, said valve means opening upon movement of said second piston portion into said second chamber, whereby water contained in said second chamber is ejected through said passage into said combustion space.

2. An apparatus as defined in claim 1 in which a spring means is provided for normally biasing said valve means to closed position, said passage being provided with a counterbored portion to receive said spring means.

3. An apparatus as defined in claim 1 in which a spring is provided for normally biasing said piston member toward said cylinder head, said spring being positioned in said first chamber and surrounding the part of said second piston portion positioned in said first chamber, the natural length of said spring being less than the axial distance from the top of said first piston portion to the end of said first chamber facing said top of said first piston portion.

4. An apparatus as defined in claim 1 in which means is provided to lock said piston against motion.

5. An apparatus as defined in claim 1 in which means is provided to lock said piston against motion, said means comprising a locking bar movable through an aperture in said casing so as to overlie said piston and prevent motion thereof.

References Cited in the file of this patent

UNITED STATES PATENTS

| | | |
|---|---|---|
| 1,156,846 | Johnson | Oct. 12, 1915 |
| 1,202,802 | Carter | Oct. 31, 1916 |
| 1,625,205 | Grumme | Apr. 19, 1927 |
| 2,531,666 | Bower | Nov. 28, 1950 |